US008642353B2

(12) United States Patent
Welle (10) Patent No.: US 8,642,353 B2
(45) Date of Patent: Feb. 4, 2014

(54) MICROFLUIDIC DEVICE FOR INDUCING SEPARATIONS BY FREEZING AND ASSOCIATED METHOD

(75) Inventor: Richard P. Welle, Huntington Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 881 days.

(21) Appl. No.: 11/690,115

(22) Filed: Mar. 22, 2007

(65) Prior Publication Data
US 2011/0210082 A9 Sep. 1, 2011

Related U.S. Application Data

(63) Continuation-in-part of application No. 10/877,691, filed on Jun. 24, 2004, now Pat. No. 7,757,717, which is a continuation-in-part of application No. 10/843,515, filed on May 10, 2004, now Pat. No. 7,694,694.

(51) Int. Cl.
*G01N 1/18* (2006.01)
*B01D 11/04* (2006.01)
*F15C 1/04* (2006.01)

(52) U.S. Cl.
USPC ............................ 436/177; 422/260; 137/828

(58) Field of Classification Search
USPC ........................................................ 436/177
See application file for complete search history.

(56) References Cited

U.S. PATENT DOCUMENTS

| 2,910,836 | A | 11/1959 | Karrer |
| 2,928,253 | A | 3/1960 | Lopp et al. |
| 3,111,813 | A | 11/1963 | Blumentritt |
| 3,197,342 | A | 7/1965 | Neild, Jr. |
| 3,212,272 | A | 10/1965 | Sommers |
| 3,397,860 | A | 8/1968 | Bushmeyer |
| 3,779,814 | A | 12/1973 | Miles et al. |
| 4,476,685 | A | 10/1984 | Aid |
| 4,920,264 | A | 4/1990 | Becker |
| 4,938,258 | A | 7/1990 | Sato |
| 4,989,626 | A * | 2/1991 | Takagi et al. .................. 137/13 |

(Continued)

OTHER PUBLICATIONS

Chen et al., "Thermally-actuated, phase change flow control for microfluidic systems," Lab Chip, 5, 1277-1285 (Published on Web Sep. 21, 2005).

(Continued)

*Primary Examiner* — Bobby Ramdhanie
*Assistant Examiner* — Bryan Kilpatrick
(74) *Attorney, Agent, or Firm* — Jones Day; Jaime D. Choi (57) ABSTRACT

A microfluidic device is provided for inducing the separation of constituent elements from a microfluidic sample by introducing phase changes in the microfluidic sample while contained in a microfluidic channel in the device. At least a portion of the microfluidic sample is frozen to cause fractional exclusion of the constituent element from the frozen portion of the microfluidic sample. Different portions of the microfluidic sample may be frozen in different sectors and at different times in order to cause movement in a desired direction of the separated constituent element. Portions of the microfluidic sample may be frozen in a sequential order of adjacent sectors within the microfluidic channel in order to cause sequential movement of the excluded constituent element toward one portion of the microfluidic channel. The frozen portion of the microfluidic sample is then thawed, wherein the separated constituent element remains substantially separated from the thawed, purified microfluidic sample.

41 Claims, 9 Drawing Sheets

(56) References Cited

U.S. PATENT DOCUMENTS

| | | | |
|---|---|---|---|
| 5,101,848 | A | 4/1992 | Kojima et al. |
| 5,249,929 | A | 10/1993 | Miller, Jr. et al. |
| 5,603,351 | A | 2/1997 | Cherukuri et al. |
| 5,662,143 | A | 9/1997 | Caughran |
| 5,699,157 | A | 12/1997 | Parce |
| 5,795,788 | A | 8/1998 | Bevan et al. |
| 5,849,208 | A | 12/1998 | Hayes et al. |
| 5,975,856 | A * | 11/1999 | Welle ............................ 417/53 |
| 5,988,197 | A | 11/1999 | Colin et al. |
| 5,993,634 | A | 11/1999 | Simpson et al. |
| 6,007,302 | A | 12/1999 | Welle |
| 6,086,740 | A | 7/2000 | Kennedy |
| 6,100,463 | A | 8/2000 | Ladd et al. |
| 6,120,985 | A | 9/2000 | Laugham et al. |
| 6,149,123 | A | 11/2000 | Harris et al. |
| 6,159,744 | A | 12/2000 | Bevan et al. |
| 6,282,907 | B1 | 9/2001 | Ghoshal |
| 6,283,718 | B1 | 9/2001 | Prosperetti et al. |
| 6,311,713 | B1 | 11/2001 | Kaartinen |
| 6,328,070 | B2 | 12/2001 | Clayton et al. |
| 6,344,325 | B1 | 2/2002 | Quake et al. |
| 6,349,740 | B1 | 2/2002 | Cho et al. |
| 6,382,254 | B1 | 5/2002 | Yang et al. |
| 6,387,234 | B1 | 5/2002 | Yeung et al. |
| 6,408,878 | B2 | 6/2002 | Unger et al. |
| 6,453,928 | B1 | 9/2002 | Kaplan et al. |
| 6,467,275 | B1 | 10/2002 | Ghoshal |
| 6,521,188 | B1 | 2/2003 | Webster |
| 6,536,476 | B2 | 3/2003 | Ueno et al. |
| 6,540,895 | B1 | 4/2003 | Spence et al. |
| 6,557,575 | B1 | 5/2003 | Gerhardt et al. |
| 6,561,479 | B1 | 5/2003 | Eldridge |
| 6,575,188 | B2 | 6/2003 | Parunak |
| 6,598,403 | B1 | 7/2003 | Ghoshal |
| 6,599,098 | B2 | 7/2003 | Weng et al. |
| 6,619,311 | B2 | 9/2003 | O'Connor et al. |
| 6,637,210 | B2 | 10/2003 | Bell |
| 6,658,860 | B2 | 12/2003 | McGrew |
| 6,679,279 | B1 | 1/2004 | Liu et al. |
| 6,767,706 | B2 | 7/2004 | Quake et al. |
| 6,793,753 | B2 | 9/2004 | Unger et al. |
| 6,857,449 | B1 | 2/2005 | Chow |
| 6,877,528 | B2 | 4/2005 | Gilbert et al. |
| 6,880,576 | B2 | 4/2005 | Karp et al. |
| 6,959,555 | B2 | 11/2005 | Bell |
| 6,981,522 | B2 | 1/2006 | O'Connor et al. |
| 7,008,193 | B2 | 3/2006 | Najafi et al. |
| 7,128,081 | B2 | 10/2006 | Dourdeville |
| 7,195,036 | B2 | 3/2007 | Burns et al. |
| 7,216,660 | B2 | 5/2007 | Troian et al. |
| 7,241,421 | B2 | 7/2007 | Webster et al. |
| 7,650,910 | B2 | 1/2010 | Welle |
| 7,686,040 | B2 | 3/2010 | Welle |
| 7,694,694 | B2 | 4/2010 | Welle |
| 7,721,762 | B2 | 5/2010 | Welle |
| 7,757,716 | B2 | 7/2010 | Welle |
| 7,757,717 | B2 | 7/2010 | Welle |
| 2002/0007858 | A1 | 1/2002 | Xu et al. |
| 2002/0029814 | A1 | 3/2002 | Unger et al. |
| 2002/0092363 | A1 * | 7/2002 | Jorgenson et al. ......... 73/861.95 |
| 2002/0124879 | A1 | 9/2002 | Kaplan et al. |
| 2002/0127736 | A1 | 9/2002 | Chou et al. |
| 2002/0143437 | A1 | 10/2002 | Handique et al. |
| 2002/0144738 | A1 | 10/2002 | Unger et al. |
| 2002/0145231 | A1 | 10/2002 | Quake et al. |
| 2002/0148234 | A1 | 10/2002 | Bell |
| 2002/0150683 | A1 | 10/2002 | Troian |
| 2002/0166585 | A1 | 11/2002 | O'Connor et al. |
| 2003/0008308 | A1 | 1/2003 | Enzelberger et al. |
| 2003/0019522 | A1 | 1/2003 | Parunak |
| 2003/0019833 | A1 | 1/2003 | Unger et al. |
| 2003/0061687 | A1 | 4/2003 | Hansen et al. |
| 2003/0080442 | A1 | 5/2003 | Unger |
| 2003/0089865 | A1 | 5/2003 | Eldridge |
| 2003/0096310 | A1 | 5/2003 | Hansen et al. |
| 2003/0106799 | A1 | 6/2003 | Covington et al. |
| 2003/0152463 | A1 | 8/2003 | Shuler et al. |
| 2003/0159999 | A1 * | 8/2003 | Oakey et al. ............... 210/695 |
| 2003/0231967 | A1 | 12/2003 | Najafi et al. |
| 2004/0073175 | A1 | 4/2004 | Jacobson et al. |
| 2004/0084647 | A1 | 5/2004 | Beden et al. |
| 2004/0086871 | A1 | 5/2004 | Schembri |
| 2004/0115731 | A1 | 6/2004 | Hansen et al. |
| 2004/0179975 | A1 | 9/2004 | Cox et al. |
| 2004/0219732 | A1 | 11/2004 | Burns et al. |
| 2004/0248167 | A1 | 12/2004 | Quake et al. |
| 2005/0086830 | A1 | 4/2005 | Zukor et al. |
| 2005/0247356 | A1 | 11/2005 | Welle |
| 2005/0247357 | A1 * | 11/2005 | Welle ............................ 137/828 |
| 2005/0247358 | A1 * | 11/2005 | Welle ............................ 137/828 |
| 2005/0249607 | A1 | 11/2005 | Klee |
| 2005/0260081 | A1 | 11/2005 | Tanaka et al. |
| 2005/0284511 | A1 | 12/2005 | Welle |
| 2005/0284526 | A1 | 12/2005 | Welle |
| 2005/0284527 | A1 | 12/2005 | Welle |
| 2007/0227592 | A1 | 10/2007 | Allen et al. |
| 2010/0200093 | A1 | 8/2010 | Welle |
| 2010/0229986 | A1 | 9/2010 | Welle |

OTHER PUBLICATIONS

Ozaki, "Pumping mechanism using periodic phase changes of a fluid," Micro Electro Mechanical Systems, 1995, MEMS '95, Proceedings, IEEE, 31-36 (Jan. 29-Feb. 2, 1995).

Sim et al., "A phase change type micropump with aluminum flap valves," J. Micromech. Microeng., 13 (2003) 286-294 (Published Jan. 29, 2003).

Welle et al., "Peltier-actuated microvalve performance optimization," Proceedings of the 24th International Conference on Thermoelectrics, Clemson (Jun. 2005).

Welle et al., "The Peltier-actuated microvalve," Proceedings of the 23rd International Conference on Thermoelectrics, Adelaide (Jul. 27, 2004).

* cited by examiner

MICROFLUIDIC DEVICE FOR INDUCING SEPARATIONS BY FREEZING AND ASSOCIATED METHOD

This application is a continuation-in-part application of U.S. patent application Ser. No. 10/877,691, filed Jun. 24, 2004, now U.S. Pat. No. 7,757,717, which is a continuation-in-part of U.S. patent application Ser. No. 10/843,515, filed May 10, 2004, now U.S. Pat. No. 7,694,694.

TECHNICAL FIELD

This disclosure relates generally to the field of microfluidic devices and, more particularly, to the separation and purification of microfluidic samples.

BACKGROUND

Microscopic mechanical systems have been evolving for use in devices for sensing acceleration, pressure, and chemical composition, and have also been used as actuators, such as moving mirrors, shutters, and aerodynamic control surfaces. More particularly, micromechanical systems have been proposed for use in fluid control, such as in medical pharmaceuticals, bearing lubricators and miniature space systems. Many types of fluid flow control systems require the use of pumps and valves. Developments in miniaturization and large-scale integration in fluidics have led to the concept of creating microfluidic devices on a microscopic scale.

One category of functions essential to many microfluidic analysis processes involves separations, and includes such functions as concentration, separation, and purification. These functions are based on the need to increase or decrease the concentration of a solute relative to a solvent, or suspended particulates relative to a carrier. In macroscopic systems, methods employed for this function include filtration, evaporation, and chromatography, none of which, for various reasons, are easily implemented in microfluidic systems. Thus far, researchers experimenting with freezing as a method of separation on the macroscopic scale have met with limited success.

Freeze concentration is based on the phenomenon of exclusion of solute molecules or particulates during crystallization of a solvent. For example, freezing a sample of salt water will produce a number of crystals of relatively pure water separated by regions of brine (either solid or liquid, depending of the final temperature of the sample). There are a number of difficulties associated with actually implementing freeze concentration techniques. Once the sample is frozen, it is not possible to separate the regions of relatively high and low concentrations of the solute because they are thoroughly interlocked, where this results from the difficulty in providing precise control of the freezing process.

A key problem is that an advancing ice front will push any solute ahead of it, causing a local buildup of solute concentration immediately adjacent to the ice front that will normally dissipate only through diffusion, which is an inherently slow process. As the solute concentration gets higher, the freezing point of the liquid is decreased. The temperature of the ice thus has to get well below the normal freezing point of the liquid in order to induce further growth of the ice. The proximity of the sub-cooled ice and the relatively warmer liquid beyond the region of elevated solute concentration sets up a thermal gradient in the liquid, where the temperature of the liquid immediately adjacent to the ice is below the normal freezing point of water. If the solute concentration gradient is sufficiently steep compared to the thermal gradient, then the gradient in the local freezing point of the fluid will be steeper than the thermal gradient in the fluid. Under these conditions, the planar ice front becomes unstable, leading to a dendritic growth process in which tree-like solid structures form. The dendrites trap regions of high solute concentration. If the temperature gradient is steep enough relative to the concentration gradient, it may also be possible for freezing to nucleate in the fluid at a point some distance away from the ice front and beyond the region of high solute concentration, again trapping solute between layers of ice. In either case, the end result is a random collection of ice crystals trapping bands of high solute concentration between adjacent ice layers. Because the freezing occurs irregularly, the bands of high solute concentration are irregular in shape, and cannot be easily separated from the relatively pure ice crystals.

Due to these difficulties associated with freeze separation on the macroscopic scale and to the lack of experience in providing proper temperature controls on the microscopic scale, freeze separation has not previously been considered possible for microfluidic devices. There is a need for improved methods for achieving separations in microfluidic devices.

SUMMARY

According to a feature of the disclosure, a microfluidic device and method are provided for inducing the separation of constituent elements from a microfluidic sample by inducing phase changes in the microfluidic sample. In one aspect, the microfluidic sample is introduced into a microfluidic channel in a microfluidic device, and at least a portion of the microfluidic sample is frozen to cause fractional exclusion of the constituent element from the frozen portion of the microfluidic sample. In another aspect, portions of the microfluidic sample are frozen in different sectors within the microfluidic channel at different times in order to cause movement in a desired direction of the constituent element being separated from the frozen portions of the microfluidic sample. In another aspect, the portions of the microfluidic sample are frozen in a sequential order of adjacent sectors within the microfluidic channel in order to cause sequential movement of the excluded constituent element toward one portion of the microfluidic channel. The frozen portion of the microfluidic sample may then be thawed, wherein the separated constituent element remains substantially separated from the thawed and purified microfluidic sample.

In accordance with another feature, the microfluidic freeze separation device induces separations in a fluid containing solutes and/or particulates that are confined within a microfluidic channel. Separations are inducted by triggering the formation of an ice crystal on one side of the microfluidic channel and growing the ice crystal across the channel by controlling the temperature of the channel, thereby fractionally excluding and displacing the solutes and/or particulates. By confining the process to a microfluidic channel in the device, several enhancements become possible that are not possible on macroscopic scales, including precise temperature control, repeating cycling to enhance separation, and cross-flow devices in which the fluid moves in one direction while waves of freezing and melting move across the channel in a direction perpendicular to the direction of fluid flow.

According to another feature, a microfluidic device and method are provided for mixing fluids on a microfluidic scale in a microfluidic device. A plurality of fluids are introduced into a microfluidic channel in a microfluidic device. The fluids are then subjected to cyclical freezing and melting in different sectors of the microfluidic channel to achieve mixing of the fluids together.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the following description, numerous embodiments are set forth in order to provide a thorough understanding of the invention. It will be apparent, however, to one skilled in the art, that these and other embodiments may be practiced without these specific details. In other instances, well-known features have not been described in detail in order not to obscure the invention.

For purposes of this description, a "microfluidic" device has one or more channels or chambers with at least one dimension less than 1 mm.

There are many promising applications for a microfluidic freeze separation device formed in accordance with the present disclosure, including but not limited to water quality monitoring, contamination investigations, and in microbiological sample and analysis systems. For example, microfluidics may enable inexpensive, field-deployable systems for water quality monitoring or for biological sampling. Such devices could potentially detect the presence of contaminants, pathogens, or toxins in very small samples. Microfluidic handling processes involved in these applications include valving, storage, pumping, metering, and thermal cycling. The Peltier-actuated microvalve and its derivatives, also developed by the present inventor, have assisted in making such applications possible.

Examples of microfluidic valve devices are described in detail in the following patents and patent applications: U.S. patent application Ser. No. 11/190,312, entitled "Fast Acting Valve Apparatuses" filed on Jul. 26, 2005, U.S. patent application Ser. No. 11/150,551, entitled "Electro-hydraulic Valve Apparatuses" filed on Jun. 9, 2005, U.S. patent application Ser. No. 10/877,691 entitled "Microfluidic Devices With Separable Actuation and Fluid-Bearing Modules" filed on Jun. 24, 2004, U.S. patent application Ser. No. 10/877,602 entitled "Microfluidic Valve Apparatuses With Separable Actuation and Fluid-Bearing Modules" filed on Jun. 24, 2004, U.S. patent application Ser. No. 10/843,515 entitled "Phase-Change Valve Apparatuses" filed on May 10, 2004, U.S. Pat. No. 6,007,302 entitled "Mechanical valve having n-type and p-type thermoelectric elements for heating and cooling a fluid between an inlet and an outlet in a fluid pump" issued on Dec. 28, 1999, and U.S. Pat. No. 5,975,856 entitled "Method of pumping a fluid through a micromechanical valve having N-type and P-type thermoelectric elements for heating and cooling a fluid between an inlet and an outlet" issued on Nov. 2, 1999, the contents of which of all of the above-listed patents and patent applications are incorporated herein by reference in their entirety.

Referring now to FIGS. 1A-1G, cross-sectional top views of a microfluidic freeze separation device 100 formed in accordance with one embodiment are illustrated. The microfluidic device 100 includes a microfluidic channel or chamber 102 for holding a microfluidic sample 104 while separations of at least one constituent element 106 from a microfluidic sample 104 are induced by introducing phase changes in the microfluidic sample 104. In one aspect, the microfluidic sample 104 is introduced into a microfluidic channel 102 in the microfluidic device 100, and at least a portion of the microfluidic sample 104 is frozen to cause fractional exclusion of the constituent element 106 from the frozen portion of the microfluidic sample 104.

In accordance with one embodiment, the microfluidic sample 104 will be described as a solution containing water as a solvent having suspended particles or a solute, because water-based fluids are common in science and industry. However, it is the intention of the present inventor that the microfluidic device 100 can be similarly utilized to separate solutions having non-water solvents. Further, the solubility of a solute is generally but not always higher in a liquid phase than in a solid phase, and the microfluidic sample 104 will be described in several embodiments as including a solute having a higher solubility in its liquid phase. However, it is the intention of the present inventor that the microfluidic device 100 can similarly be utilized to separate solutions in which the solubility of the solute is lower in a liquid phase than in a solid phase. The microfluidic device 100 achieves the microfluidic separation process by inducing a phase change in at least a portion of the microfluidic sample 104, such as by cooling a carrier fluid or solvent to cause the formation of a solid phase that excludes either suspended particles or a solute.

Figure 1A:
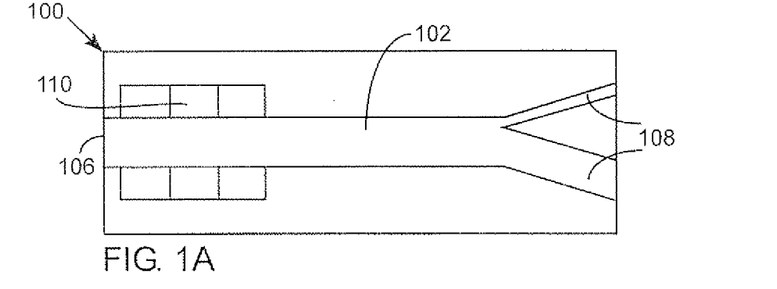
FIGS. 1A-1I are partial cross-sectional top views of a microfluidic freeze separation device in accordance with one embodiment of the present disclosure.
Figure 1B:
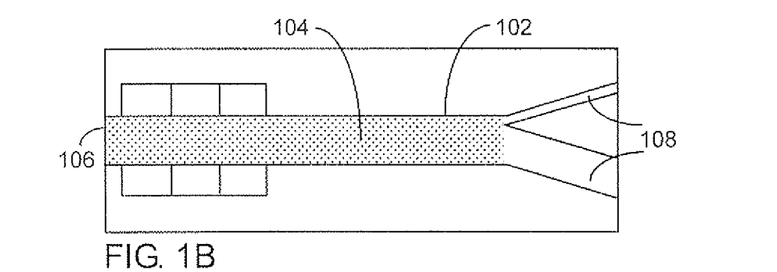
Figure 1C:
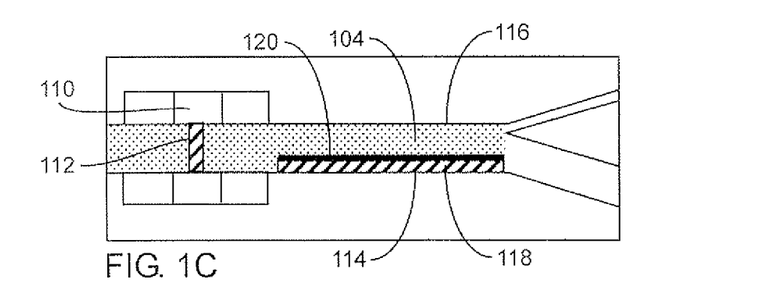

In one embodiment, the microfluidic channel 102 includes an inlet 106 and at least one outlet 108. In one aspect, the dimensions of the microfluidic channel 102 may be approximately 1-3 mm wide, 50 microns deep, and 25 mm long. The microfluidic sample 104 containing a solute and/or suspended particles is introduced through the inlet 106 and through an inlet valve 110 into the microfluidic channel 102 until the microfluidic sample 104 fills the microfluidic channel 102 to a desirable level, such as to a point adjacent to the outlet(s) 108, as illustrated in FIG. 1C. In one embodiment, the inlet valve 110 is a microfluidic valve, such as a Peltier-actuated microvalve incorporated by reference hereinabove.

After the microfluidic sample 104 is introduced into the microfluidic channel 102, the inlet valve 110 is closed, as illustrated in FIG. 1C, by cooling the microfluidic sample 104 to form an ice plug 112 in the microfluidic sample 104 adjacent to the inlet valve 110. The microfluidic channel 102 is then cooled asymmetrically such that a temperature gradient is created across the width of the channel such that the bottom edge 114 is colder than the top edge 116 of the microfluidic channel 102. When the microfluidic channel 102 becomes cold enough, the microfluidic sample 104 freezes and an ice crystal 118 begins to form along the bottom edge 114, as illustrated in FIG. 1C. As the frozen portion 118 grows, particulates, solutes or other constituent elements 120 are excluded from the frozen portion 118. As the microfluidic channel 102 is further cooled, the frozen portion 118 grows across the microfluidic channel 102 from the bottom edge 114 to the top edge 116, thereby transporting the excluded or separated constituent element 120 to the top edge 116 of the microfluidic channel 102, as illustrated in FIG. 1D.

After the frozen portion 118 has grown across the majority (or possibly all) of the microfluidic channel 102, the constituent element(s) 120 (e.g., solutes and/or particulates) are concentrated in a narrow band in a sector 122 along the top edge 116 of the microfluidic channel 102. The microfluidic device 100 may then warm the frozen portion 118 to create a purified, melted microfluidic sample 124 in the microfluidic channel 102, as illustrated in FIG. 1E. Melting of the frozen portion 118 does not directly cause any transport of the excluded constituent element(s) 120, as the excluded constituent element(s) 120 will tend to remain along the top sector 122 of the microfluidic channel 102. Diffusive transport, which would tend to spread any particulates or solutes evenly across the width of the channel, is relatively slow and substantially does not occur on the relevant time scales.

After the frozen portion 118 has melted, the flow of the microfluidic sample 104 through the microfluidic channel 102 is resumed by opening the inlet valve 110. In one embodiment, a first outlet 108a is provided for the excluded constituent element(s) 120 while a second outlet 108b is provided for the melted microfluidic sample 124, as illustrated in FIG. 1F. Because flow on the microfluidic size scale is strictly laminar, the fluid containing the concentrated excluded constituent element(s) 120 will travel out of the adjacent first outlet 108a while the purified, melted microfluidic fluid 124 depleted of solute and/or particulates will travel out of the adjacent second outlet 108b.

Figure 1D:
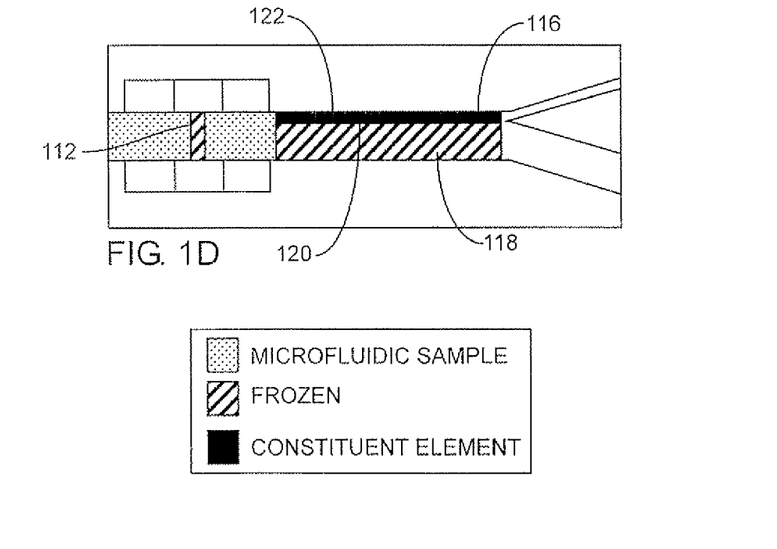
Figure 1E:
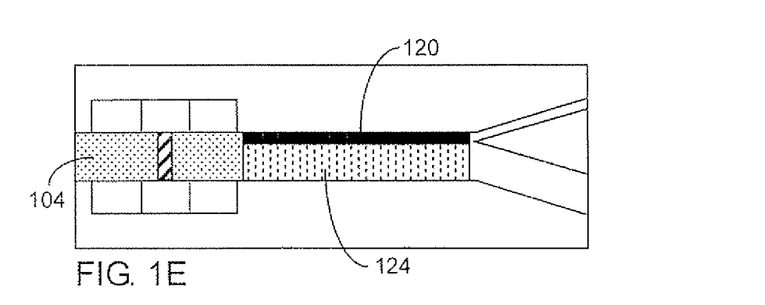
Figure 1F:
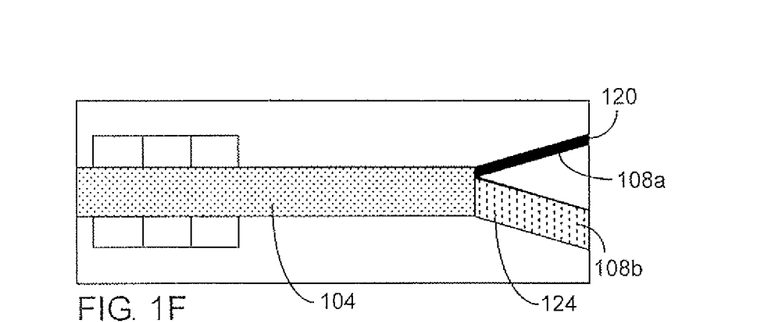
Figure 1G:
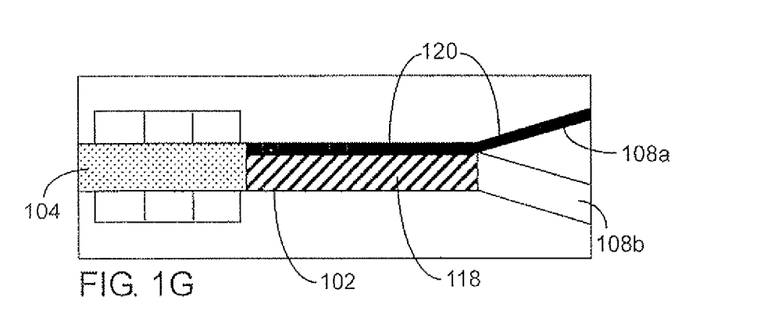
Figure 1H:
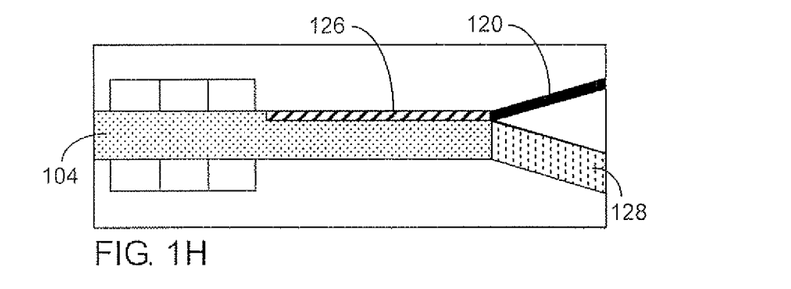
Figure 1I:
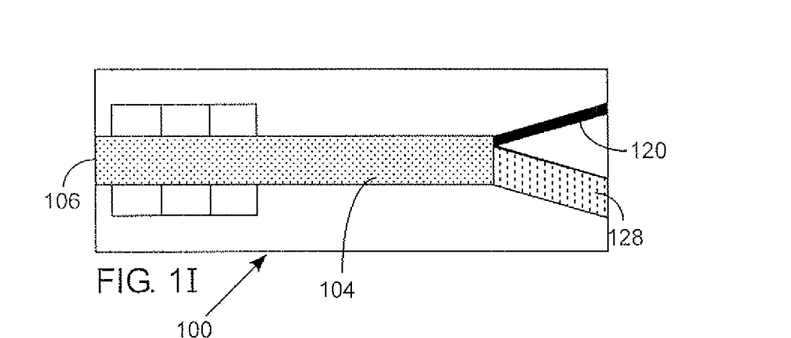

In another embodiment, in order to provide further protection against diffusive transport of the excluded constituent element(s) 120 across the microfluidic channel 102, the relatively pure solvent that remains in the frozen portion 118 of the microfluidic sample 104 shown in FIG. 1D may be left in the solid frozen state while the concentrated excluded constituent element(s) 120 are pumped into the adjacent first outlet 108a, as illustrated in FIG. 1G. The portion 126 of the microfluidic sample 104 in the upper sector 122 of the microfluidic channel 102 may then be frozen while the frozen portion 118 is melted, and the melted pure solvent 128 may then be pumped into the adjacent second outlet 108b, as illustrated in FIG. 1H. Finally, the frozen portion 126 in the upper sector 122 of the microfluidic channel 102 is melted, as illustrated in FIG. 1I, and the microfluidic device 100 is then capable of beginning the process again to induce separations in the microfluidic sample 104 in the microfluidic channel 102.

Figure 2:
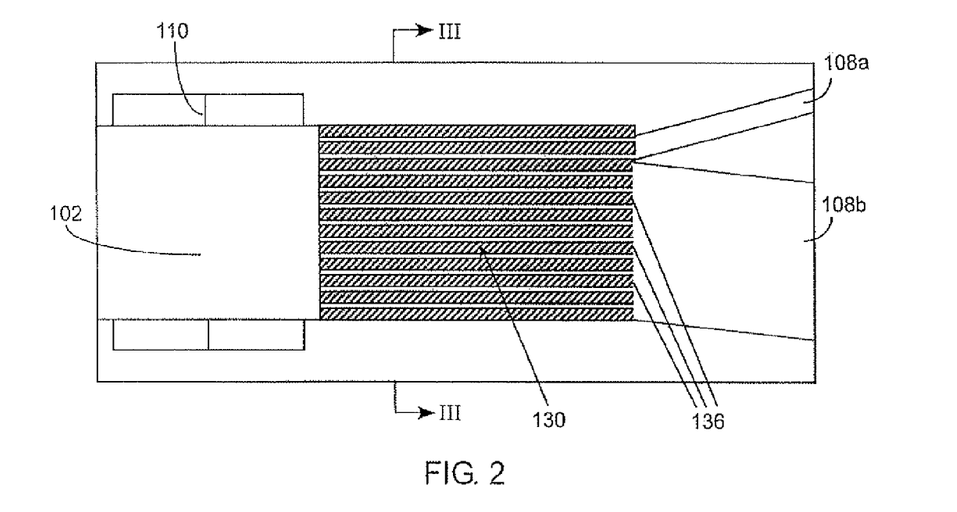
FIG. 2 is a partial cross-sectional top view of a microfluidic freeze separation device in accordance with one embodiment of the present disclosure.
Figure 3:
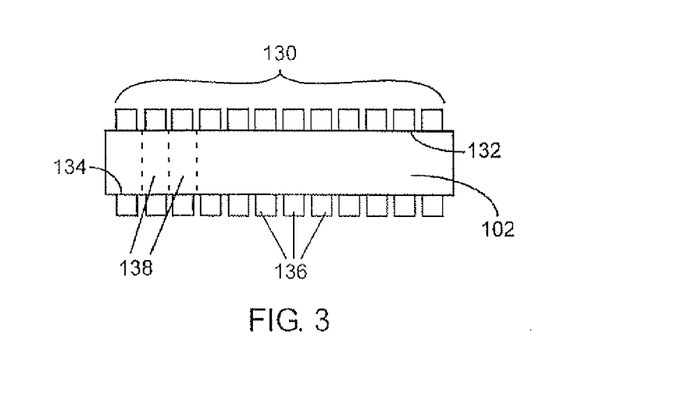
FIGS. 3-5 are cross-sectional side views of various embodiments of the microfluidic freeze separation device taken generally along lines III-III of FIG. 2.

Referring now to FIG. 2, a top view of one embodiment of a microfluidic freeze separation device 100 is illustrated. The device 100 includes an inlet 106 and an inlet valve 110 on one side of the microfluidic channel 102 and a pair of outlets 108a, 108b on the opposite side of the microfluidic channel 102 from the inlet 106. An actuation module 130 is positioned adjacent to at least one face of the microfluidic channel 102, such as upper face 132 or lower face 134 (or possibly both faces 132, 134 as illustrated in FIG. 3), so as to operatively interface with the microfluidic channel 102 to introduce a phase change in the microfluidic sample 104. In one embodiment, the actuation module includes an array of actuation elements 136. In one embodiment, the actuation elements 136 may comprise an array of parallel linear thermal control elements (TCEs 136), e.g., heaters and/or coolers, aligned in a direction parallel to the long axis of the microfluidic channel 102. In another embodiment, the actuation elements 136 may comprise at least one Peltier device for providing heating and/or cooling functionality. In still further embodiments, the actuation elements 136 may comprise either optical or microwave devices for providing heating and/or cooling functionality.

The microfluidic channel 102 may be represented by a plurality of sectors 138 (138a . . . 138n), where each sector 138 of the microfluidic channel 102 is positioned adjacent to and operatively interfaces with a respective one of the TCEs 136. In one embodiment, the TCEs 136 may be fabricated as a thermoelectric device with a series of separately-controllable parallel cooling elements. To operate the microfluidic device 100, the thermoelectric actuation module 130 would have sectors that are each 300-500 microns wide and 25 mm long. In an alternative embodiment, the actuation module 130 may be fabricated as a single thermoelectric module (e.g., 5×25 mm) that is attached to a series of electrical resistive heaters in a pattern of parallel stripes.

Figure 4:
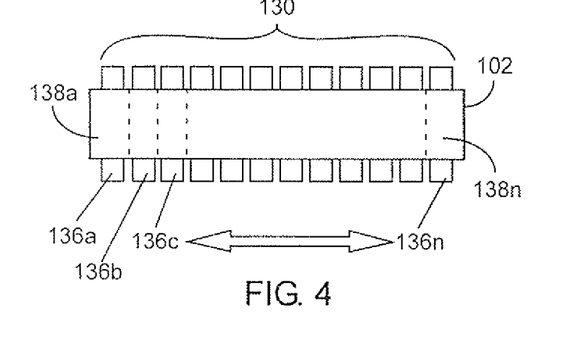
Figure 5:
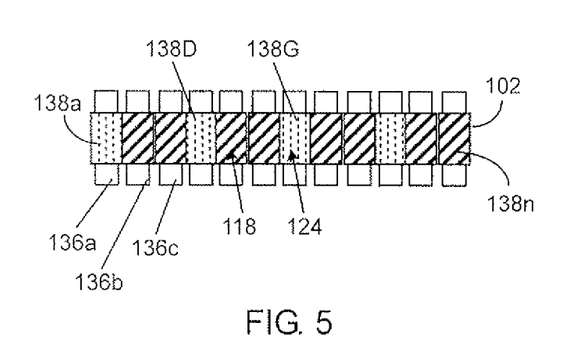

In one mode of operation in one embodiment, the array of TCEs 136 are controlled such that each successive TCE 136 (e.g., starting from TCE 136a and moving toward TCE 136n for n number TCEs 136, as illustrated in FIG. 4) would be switched in series from a warm state to a cold state until a sufficient number of TCEs 136 are cold to induce the desired frozen portion 118 in the microfluidic sample 104, as illustrated in FIG. 1D. In the embodiment illustrated in FIG. 1H, at least one TCE 136n adjacent to the upper edge 116 of the microfluidic channel 102 can be used as necessary to freeze the portion 126 of the microfluidic sample 104 while the melted pure solvent 128 is pumped out of the microfluidic channel 102 into the adjacent second outlet 108b.

Operating a freeze separation device and process on the microfluidic scale offers several advantages that are not available to macroscopic devices: precise temperature control, repeated cycling of the microfluidic sample 104 for fractional exclusion of the constituent element(s) 120, using multiple simultaneous cycles for shortening the separation process, the use of cross flow for improving separation performance, utilizing geometries of the inlet 106, the microfluidic channel 102 and the outlets 108 that enhance transportation of the fluids during the separation process, differential separation of different constituent elements 120 from the microfluidic sample 104, and the mixing of fluids on a microfluidic scale. Each of these advantages will be described separately below.

Precise Temperature Control

In one aspect, the growth rate of the ice front of the frozen portion 118 of the microfluidic sample 104 is controlled by the temperature gradient in the microfluidic device 100. If this temperature gradient gets too steep, the growth process can become unstable, leading to incomplete separation. Some of this instability is due to the unsteady nature of heat transport in systems large enough to have significant convective heat transport. However, in the microfluidic scale such as in the microfluidic device 100, the short distances between the ice front of the frozen portion 118 of the microfluidic sample 104 and the TCEs 136, as well as the lack of significant convective heat transport, make it possible to provide much more precise temperature control that is not achievable on the macroscopic level. As such, it is possible to create higher average temperature gradients (without needing to be concerned about local thermal instabilities), leading to higher ice-front growth rates. In the embodiment of the microfluidic device 100 shown in FIGS. 2 and 3 with independent control of each of the TCEs 136, it would be possible to control the temperature of the microfluidic sample 104 over very narrow sectors 138, and provide precise control on the growth rate of the ice front of the frozen portion 118 across the sectors 138.

Cycling

Separation induced by freezing on the macroscopic scale is imperfect based on two principal issues. First, a small fraction of the solute can be trapped in a growing ice front and, second, the ice front tends to jump over or around regions of high solute concentration, trapping them as described above. On the macroscopic scale, the only ways to prevent these problems are to slow the growth rate of the ice front and to induce circulation in the fluid to dissipate temperature and concentration gradients. Further, repeated cycling is difficult to perform on the macroscopic scale because convective transport re-mixes the fluid as soon as it is melted.

In accordance with one feature of the disclosure, simpler methods of repeated cycling are made possible on the microfluidic scale for three reasons: 1) the lack of convective currents, 2) the presence of laminar flow, and 3) the small separation distances required. By utilizing the microfluidic device 100 that takes advantage of these conditions of microfluidic flow, if there is no significant back flow of the solutes/particulates 120 being excluded, then the degree of purification of the solvent 124 and concentration of the solutes/particulates 120 can be increased through repeated cycling.

Figure 13:
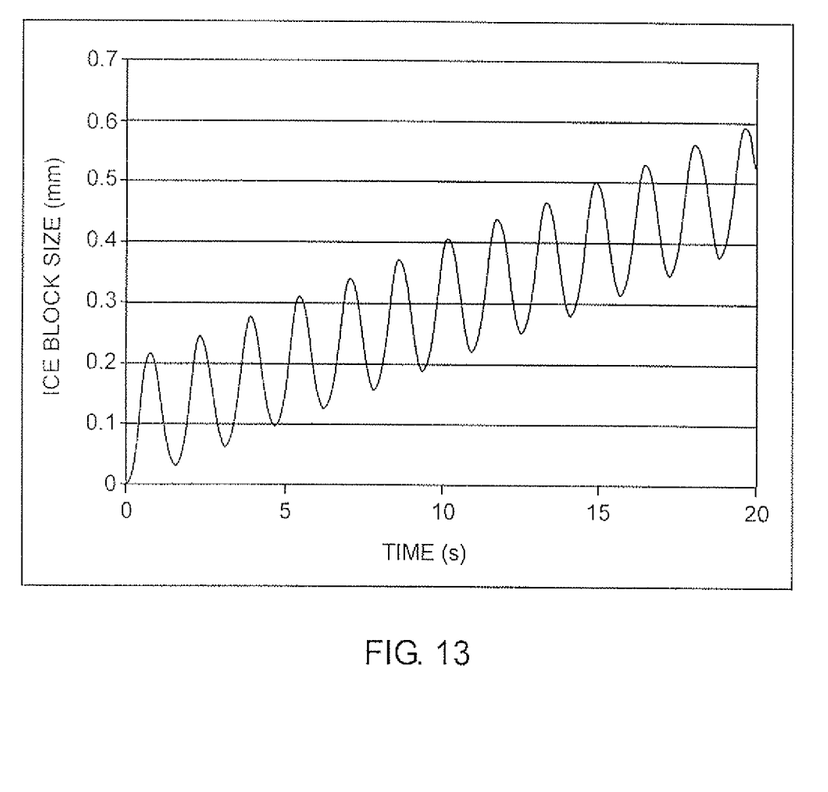
FIG. 13 is a graphical illustration of a zone of frozen microfluidic sample over time in accordance with one embodiment of the present disclosure.

In one embodiment, the size of the frozen portion 118 or zone of the microfluidic sample 104 is alternately increased and decreased by changing the temperature profile across the microfluidic device 100. As the frozen zone 118 increases in size, the advancing liquid-solid phase boundary tends to push solute molecules and/or particulates ahead of it. When the frozen zone 118 decreases in size, the retreating liquid-solid phase boundary does not drag solute molecules or particulates with it, but merely allows them to travel back into the previously frozen region. In microfluidic devices, there are no convection currents, so the back flow of solute molecules or particulates occurs only through diffusion, which is a relatively slow process. Thus, it is possible to increase the degree of exclusion of solutes and particulates from the frozen zone 118 by cyclically varying its size. In another embodiment, the size of the frozen zone 118 is cycled around a steadily increasing mean, as shown by the graphical illustration of FIG. 13. In this embodiment, each increase in size pushes the majority of solutes or particulates to the momentary maximum of the frozen zone 118. Each swing back to a smaller size picks up another fraction of the remaining solutes or particulates to be pushed out during the next size increase. When the frozen zone 118 size follows the pattern illustrated in FIG. 13, each location in the microfluidic device 100 experiences several freeze events. For example the location at 300 microns from the origin first freezes at five seconds, then melts and freezes six more times in the next ten seconds. By adjusting the amplitude and period of the oscillations relative to the rate of increase of the mean, it is possible to control the number of freeze events at any location.

Back flow of the excluded solutes/particulates 120 can be prevented by controlling the TCEs 136a-136n to sequentially freeze adjacent zones of the microfluidic sample 104 in sequential sectors 138a to 138n of the microfluidic channel 102. Then, TCE 136a may be actuated to re-melt the frozen portion 118 in the first sector 138a of the microfluidic channel 102, followed by a sequence of steps in which the parallel array of TCEs 136 is controlled such that, periodically, for each TCE 136(x) for x=a,n that is warm, the next higher TCE 136(x+1) in the sequence is switched from cold to warm while the TCE 136(x) is switched from warm to cold. The time lag between switching the two TCEs 136(x) and 136(x+1) can be either zero, or negative or positive, to account for thermal lags in the system, or to take advantage of density changes associated with phase changes to induce pumping action (as described below). After a period T, the TCE 136(x+2) in the sequence will be switched from cold to warm while the TCE 136(x+1) will be switched back from warm to cold.

By repeating this process across all the TCEs 136a-136n, a zone of melting moves across the microfluidic channel 102 in a direction perpendicular to the direction of fluid flow through the microfluidic channel 102 from the inlet 106 to the outlets 108. When the process reaches TCE 136n, the next step is to warm TCE 136a as TCE 136n is cooled, thereby starting a new melt zone in sector 138a of the microfluidic channel 102. By repeating this cycle multiple times, the degree of separation of the constituent element(s) 120 from the microfluidic sample 104 through repeated fractional exclusion will be improved relative to that which would be obtained from the fractional exclusion of a single cycle. At the completion of the desired number of cycles, the inlet valve 110 is re-opened, and the concentrated and purified fluids are pumped out of the microfluidic channel 102 as described herein. Any solutes or particulates in the microfluidic sample 104 will be separated and concentrated in the upper sector 122 of the microfluidic channel 102 to be removed through outlet 108a while the remaining purified solvent 124, depleted of solute or particulates, will flow out through the lower outlet 108b.

Multiple Simultaneous Cycles

In one embodiment, the time required for the separation process can be shortened by using multiple simultaneous separation cycles. As the zone of melting moves across the microfluidic channel 102, it is possible to start a new melt zone in sector 138a before the previous melt zone reaches sector 138n. It is only necessary to delay subsequent cycles sufficiently that there is an unbroken frozen portion 118 between adjacent melt zones. For example, when the first cycle gets to the point where TCE 136c is warm and TCE 136b is cold, it would be possible to switch TCE 136a from cold to warm. In contrast, it would not be possible to switch TCE 136a to warm at the same time that TCE 136b is switched to cold because the frozen portion 118 in sector 138a must remain solid until the fluid in sector 138b has solidified sufficiently to prevent back flow from sector 138c to sector 138a. Thus, TCE 136a could be switched to warm at the same time as TCE 136d (a+3), TCE 136g (a+6), and TOE 136j (a+9), allowing four melt zones to traverse the microfluidic sample 104 simultaneously. In one aspect, it is not necessary that the melt zones in the microfluidic sample 104 be exactly in phase with one another. For instance, TCE 136a can be switched to warm as soon as sector 138b is sufficiently cold to ensure that there can be substantially no backflow, which may be before or after TCE 136d is scheduled to switch states. Upon completion of the required number of cycles, the concentrated and purified fluids are extracted from the microfluidic channel 102 as indicated herein.

By melting portions of the microfluidic sample 104 in different sectors 138 within the microfluidic channel 102 at different times, movement of a liquid zone and/or a frozen zone of finite sizes can be accomplished in a desired direction in the microfluidic sample 104. The array of TCEs 136 can be controlled so that each successive TCE 136 is activated in series to a hot state, with a time interval $t_1$ between activation of two successive TCEs 136. Each TCE 136 can then be activated back to a cold state at a time interval $t_2$ after it is activated to a hot state, wherein the time interval $t_1$ controls the speed at which a liquid zone moves across the sectors and the time interval $t_2$ controls the width of the liquid zone.

Cross Flow

In another embodiment, the cycling embodiments described above may further incorporate a cross flow through the microfluidic channel 102. In steady-state operation, the inlet valve 110 is left open, and the microfluidic sample 104 to be separated enters continuously through the inlet 106. The TCEs 136 are controlled in the manner described above for cycling or multiple simultaneous cycling. The continuous flow of fluid at the inlet 106 causes a continuous flow of fluid at the outlet 108. As long as the freeze separation cycling rate employed by the microfluidic device 100 is fast enough relative to the flow rate of the microfluidic sample 104 through the microfluidic channel 102, the fluid will experience a useful number of phase changes (e.g., freeze-thaw cycles) before leaving the microfluidic channel 102 to perform the requisite fractional exclusion of the constituent element(s) 120 from the microfluidic sample 104.

Multiple Simultaneous Cycles

In another embodiment, as described above for the discrete separation process, it is possible to perform multiple simultaneous freeze separation cycles across the microfluidic channel 102 as long as a continuous frozen portion 118 is maintained between successive melt zones 124. In a cross-flow embodiment of the microfluidic device 100, the multiple cycles would preferably be separated from one another by a distance no greater than the width of the inlet 106.

Inlet Channel Modifications

Figure 6:
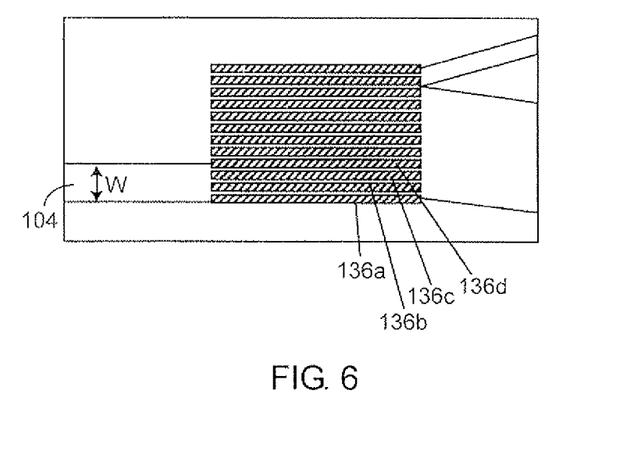
FIG. 6-9 are partial cross-sectional top views of a microfluidic freeze separation device in accordance with various embodiments of the present disclosure.

In one embodiment, the inlet 106 may comprise a channel that need only be wide enough that there is always a path for fluid to flow. Specifically, when the device is operating with multiple simultaneous freeze separation cycles, it will always be the case that at least one of the sectors 138a-138d will be open (i.e., the zone of microfluidic sample 104 in at least one of the sectors 138a-138d will not be frozen). Thus, in one embodiment, the inlet 106 is preferably only the width of the first four sectors 138a-138d, as shown in FIG. 6. In this configuration, no fluid will directly enter the remaining sectors 138e-138n from the inlet 106. Instead, fluid will be transported across the sectors 138 due to the expansion of the solvent in the microfluidic sample 104 on freezing. An alternative embodiment for fluids that contract upon freezing require a different configuration as described in further detail below.

Integral Pumping

In the embodiments of the microfluidic device 100 employing a strictly rectangular microfluidic channel 102, fluid transport would be from the inlet 106 toward the outlet 108 through open (e.g. non-frozen or non-solid) sectors 138 that connect to both the inlet 106 and the outlet 108. Fluid would also be transported across all sectors 138 due to expansion of the microfluidic sample 104 on freezing. For sectors 138 that are directly connected to the inlet 106, the net fluid transport is along a diagonal direction, with the angle determined by the relative magnitudes of the flow mechanisms (controlled by inlet 106 flow rate, sector 138 width, and the cycling frequency). For those sectors 138 without a direct connection to the inlet 106, the net flow is perpendicular to the sector 138 boundaries based strictly on the expansion of the microfluidic sample 104 on freezing. As such, with a strictly rectangular microfluidic channel 102, the fluid will tend to build up against the upper edge 16 of the microfluidic channel 102 in sector 138n, and no purified solvent 124 will be expelled to the outlet 108 from those sectors 138 that are not in direct connection with the inlet 106. Structural issues in such an arrangement can be prevented by leaving a liquid zone above the last ice zone in the microfluidic sample 104 while no further net separation occurs in sectors 138 that are not expelling purified solvent 124 to the outlet 108.

Figure 7:
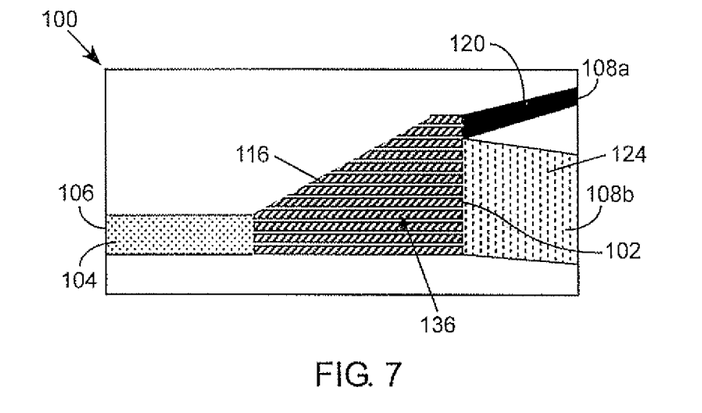

In one embodiment, the shape of the microfluidic channel 102 can be modified, as shown in FIG. 7, such that the upper edge 116 of the microfluidic channel 102 extends in a diagonal direction cutting across the array of parallel TCEs 136. In this embodiment, the expansion on freezing of the solvent in the microfluidic sample 104 will force the liquid in each of the melt zones 124 to move from the inlet 106 towards the outlets 108a and 108b (left to right in FIG. 7), thereby expelling a portion of the melted purified solvent 124 through the outlet 108b as it moves across the sectors 138. In steady-state operation, solvent in the device 100 of FIG. 7 would show a concentration gradient (in solutions or particulates) steadily decreasing from the right upper, wider portion of the microfluidic channel 102 to the left lower, narrower portion of the microfluidic channel 102. With proper balancing of the inlet 106 flow rate, cycle frequency, and shape of the upper edge 116 of the microfluidic channel 102, the fluid exiting at the end of each sector 138 into the outlet 108b will have experienced a sufficient number of freeze-thaw cycles to obtain the required degree of purification. The majority of the solute and particulates 120 will be transported across the sectors 138 by freezing, and will exit through outlet 108a adjacent to the uppermost sectors 138 ($n-1$, $n$). The geometry of the outlet 108a, 108b channels would be configured so as to prevent back flow between the outlet channels 108 at the adjacent ends of the sectors 138.

In alternative embodiment, a microfluidic device 100 is provided for expelling a portion of the fluid at each sector 138 to the outlets 108 in which the spacing between adjacent sectors 138 gradually decreases in the progression through the sectors 138a-138n. In this embodiment, the advancing ice front of the frozen portion 118 will move slightly faster than the receding melt front ahead of it, and the consequently decreasing volume of the melt zone will cause fluid to be expelled from the outlet 108. There are then two options for dealing with the final sector 138n adjacent to the upper edge 116 of the microfluidic channel 102. The first option, as mentioned above, is to have a permanent liquid zone in the microfluidic sample 104 beyond the last sector 138n. The second option is to modify the TCE 136n for the last sector such that freezing progresses from the inlet 106 toward the outlet 108, thereby expelling the excess liquid into the outlet 108 from the microfluidic channel 102. Other geometries of TCEs 136 and respective sectors 138 may also be useful that satisfy the requirements that the volume of the melt zone must decrease as it moves through successive sectors 138 in the microfluidic channel 102 and that one end of the melt zone must be open to the outlet 108.

In an alternative embodiment, further benefits may also be obtained by combining all of these modifications into a single device, including a diagonal upper edge 116 (or other non-rectangular shape), steadily decreasing spacing of the TCEs 136 and sectors 138, and inlet-to-outlet directional freezing of the microfluidic sample 104. With adequate power for thermal control, it is also possible to scale this cross-flow freeze-separation embodiment to macroscopic devices (with dimensions larger than 1 mm). Thus, the cross-flow freeze-separation principles and embodiments described herein can be equally applied to accomplish freeze separation of a constituent element from a fluidic sample in a fluidic device of both microscopic and macroscopic dimensions.

Non-Aqueous Solutions

Figure 8:
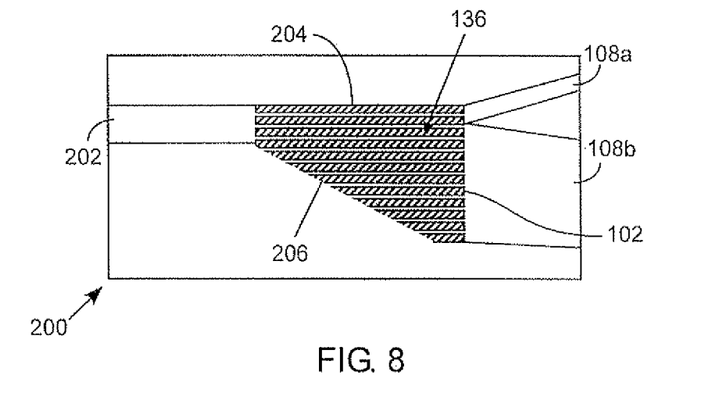

A different configuration is required for dealing with fluids that (unlike water) contract on freezing and expand on melting. With water-based solvents, the freeze-induced lateral transport of the solvent is in the direction of the advancing ice front. The lateral speed of fluid motion in each melt zone is proportional to the speed of the ice front, and the proportionality constant is the difference in the liquid and solid densities divided by the liquid density. Thus, $V_L=V_S(\rho_L-\rho_S)/\rho_L$, where $V_L$ is the speed of liquid transport in the direction perpendicular to the ice front, $V_S$ is the speed of the advancing ice front, $\rho_L$ is the density of the liquid, and $\rho_S$ the density of the solid. In water, $\rho_S$ is smaller than $\rho_L$, so $V_L$ will have the same sign as $V_S$. The same equation applies if the solid has a higher density than the liquid (contracts on freezing), in which case, $V_L$ and $V_S$ will have opposite signs. As such, the net fluid transport in non-aqueous solutions is in the direction opposite the direction of the advancing solidification front. Thus, an alternative embodiment of a microfluidic device 200 is provided for fluids that contract on freezing, as illustrated in FIG. 8, with the fluid inlet 202 adjacent to the upper edge 204 of the microfluidic chamber 102, a diagonally extending lower edge 206 of the microfluidic chamber 102, and an array of TCEs 136. The TCEs 136 are controlled such that the melt zones in the microfluidic sample 104 traverse the TCE sectors 136 from the upper edge 204 of the microfluidic chamber 102 to its lower edge 206. The diagonal lower edge 206 of the microfluidic chamber 102, combined with freeze-induced transport of fluid against the direction of travel of the melt zones, will cause fluid to be pumped toward the outlets 108a and 108b.

Similarly to the case with water, fluid transport with non-aqueous solutions can also be induced in a rectangular microfluidic chamber 102 by varying the width of the melt zone across the sectors 136. In this case, however, it would be necessary to have the sectors 136 increase in width as the sectors move from the upper edge 204 toward the lower edge of the microfluidic chamber 102. In this configuration, an expanding solidification front would be moving slightly slower than the liquefaction front it is chasing. The volume of liquid in the melt zone would thus be growing faster than the volume of the frozen zone, so liquid would be expelled. In general, any configuration that provides for a melt zone that increases in volume over successive sectors 136 will cause pumping in a fluid that expands on melting.

Differential Separation

Figure 9:
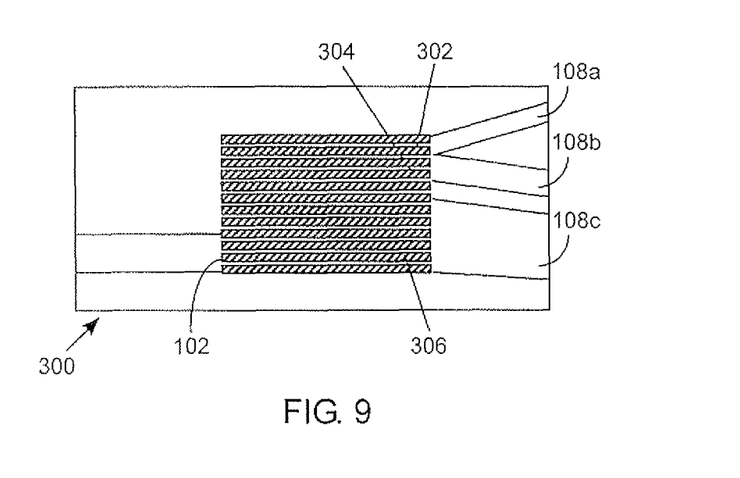

In an alternative embodiment, different constituent elements 120 can be excluded by the freeze separation process performed on the microfluidic sample 104 by capitalizing on the different degrees in which an advancing ice front excludes different constituent elements 120. In this manner, the freeze separation process thus may be useful for separating different solutes from one another. Referring now to FIG. 9, microfluidic device 300 is illustrated with a set of three outlets 108a, 108b, 108c connected to the microfluidic channel 102. Solutes that are strongly excluded from the frozen portion 118 (ice phase) of the microfluidic sample 104 during the freeze separation process are concentrated toward an upper sector 302 of the microfluidic channel 102 adjacent to the top outlet 108a. Solutes that are less strongly excluded from the frozen portion 118 (ice phase) of the microfluidic sample 104 during the freeze separation process are concentrated toward a central sector 304 of the microfluidic channel 102 adjacent to the central outlet 108b. The remaining purified solvent 124 is concentrated in the bottom sector 306 of the microfluidic channel 102 adjacent to the lower outlet 108c.

Mixing

Figure 10:
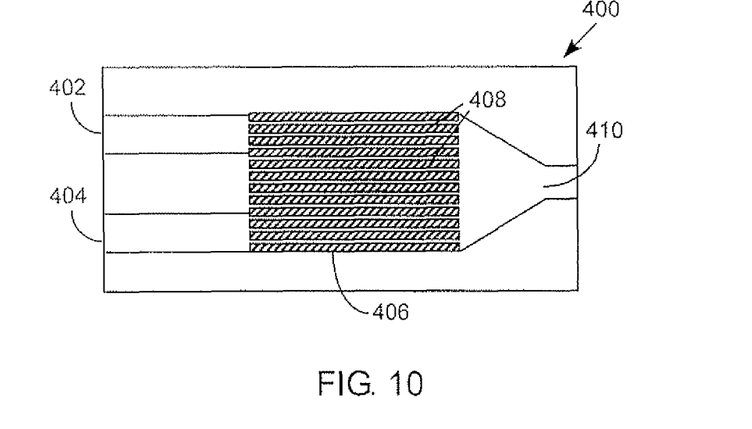
FIGS. 10-12 are partial cross-sectional top views of a microfluidic freeze mixing device in accordance with various embodiments of the present disclosure.

On the microfluidic scale, mixing has always presented problems because flow tends to be strictly laminar and diffusion has conventionally been too slow to be useful. In an alternative embodiment, a microfluidic version of zone leveling is provided to overcome the prior problems with mixing fluids on a microfluidic scale. Referring to FIG. 10, a microfluidic mixing device 400 is illustrated having a first inlet 402 and a second inlet 404 for respectively introducing a first fluid and a second fluid into a microfluidic channel 406. An array of linearly-spaced parallel TCEs are positioned adjacent to respective sectors 408 in the microfluidic channel 406 for inducing phase changes in respective zones of the first and second fluids located in the microfluidic channel 406. The first and second fluids flow into the microfluidic mixing device 400 while a series of solidification fronts move across the sector 408 in alternate directions to mix the first and second fluids together. An outlet 410 is connected to the microfluidic channel 406, where the fluid flowing out of the microfluidic channel 406 is a relatively uniform mix of the first and second fluids introduced into the microfluidic channel 406. In an alternative embodiment, the microfluidic mixing device 400 can be run in a batch mode by valving the inlets 402, 404 and/or the outlet 410. In another alternative embodiment, an output fluid can be produced with a concentration gradient of solute across the width of the output 410 channel by controlling the cycling frequency relative to the flow speed of the fluids in order to produce an output fluid that is only partially mixed. Concentration gradients could also be established by having sequential ice fronts move only part way across the microfluidic channel 406, or by having more ice fronts moving in one direction than in the other.

Figure 11:
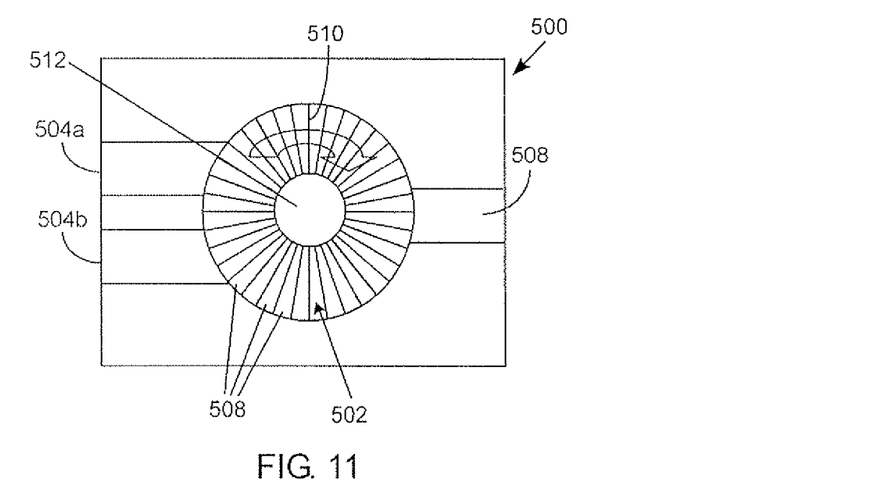
Figure 12:
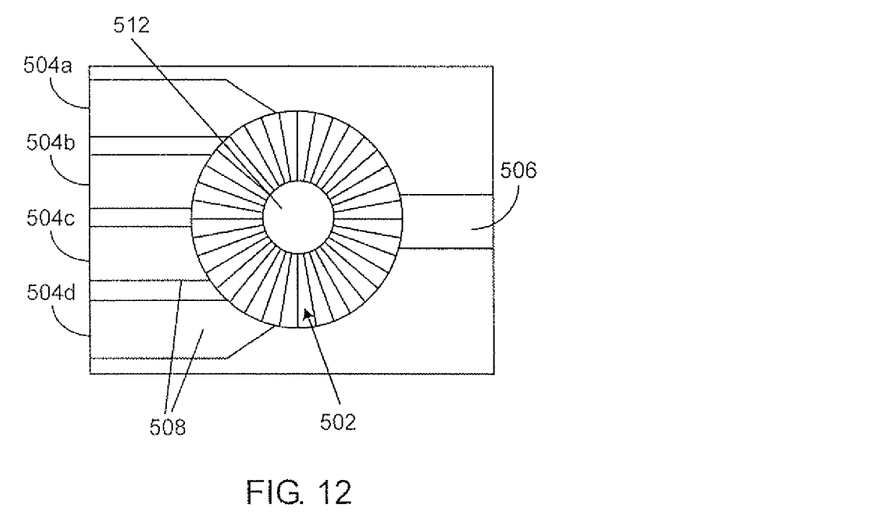

In another embodiment, the microfluidic mixing device 500 can include a circular or ring-shaped microfluidic channel 502, as shown in FIG. 11, having a melt zone moving continuously in either direction around the ring-shaped microfluidic channel 502. There are again two inlets 504a, 504b for introducing first and second fluids and a single outlet 506 for outputting the mixed fluids. A plurality of TCEs 508 are arranged in a radial pattern adjacent to the ring-shaped microfluidic channel 502, such that the ice front and melt zone move in a circular direction 510 around the ring-shaped microfluidic channel 502. In one embodiment, the microfluidic mixing device 500 could operate with multiple simultaneous melt zones and ice fronts, as described above with respect to other embodiments. In another embodiment, it is possible to mix more than two fluids by having a plurality of inlets 504a, 504b, 504c, 504d, etc., as illustrated in FIG. 12, where an inlet 504 can be provided for each additional fluid to be introduced into the microfluidic channel 502 for mixing. In one aspect, each of the inlets 504a-504d and the outlet 506 possess a width such that each would always be connected to at least one melt zone in the mixed fluids, so that flow would be continuous between the inlets 504a-504d and the outlet 506. In one embodiment, the fluids in the central portion 512 of the ring-shaped microfluidic channel 502 are kept in a liquid state to allow for flow through. The device is also versatile in the sense that any of the inlets 504a-504d and the outlet 506 can serve as flow channels to be either an inlet or outlet. In another embodiment, the inlets 504a-504d and the outlet 506 can be valved so that the device 500 can be operated in a batch mode.

The invention claimed is:

1. A microfluidic device for separating a constituent element from a microfluidic sample, comprising:
a microfluidic channel having a microfluidic dimension and configured to receive a microfluidic sample, the microfluidic channel having a length and a width and configured to conduct the microfluidic sample in a direction of flow along the length of the microfluidic channel, a plurality of zones being defined within the microfluidic channel, each zone being elongated in a direction parallel to the length of the microfluidic channel, each zone being narrower than the width of the microfluidic channel, and immediately adjacent to at least one other zone;

an actuation module including an array of actuation elements, each actuation element being adjacent to and operatively interfaced with a corresponding zone of the microfluidic channel and configured to induce a phase change in that zone by freezing a corresponding portion of the microfluidic sample in that zone, the actuation elements being actuatable independently of one another so as to freeze corresponding portions of the microfluidic sample independently of one another at different times than one another so as to cause fractional exclusion of the constituent element from the microfluidic sample across the width of the microfluidic channel and perpendicular to the direction of flow of the microfluidic sample;

a first outlet configured to receive a flow of the excluded constituent element; and a second outlet configured to receive a flow of a purified portion of the microfluidic sample from which the constituent element has been excluded, wherein the first and second outlets are configured such that the excluded constituent element in the first outlet remains substantially separated from the purified portion of the microfluidic sample in the second outlet.

2. The microfluidic device of claim 1, wherein the actuation elements are configured to freeze the corresponding portions of the microfluidic sample in a sequential order so as to sequentially move the constituent element across the width of the microfluidic channel and perpendicular to the direction of flow and to the location adjacent the first outlet.

3. The microfluidic device of claim 1, wherein the array of actuation elements comprises heating elements configured to melt the corresponding portions of the microfluidic sample.

4. The microfluidic device of claim 1, wherein the array of actuation elements comprises a plurality of linear elements aligned in a parallel manner.

5. The microfluidic device of claim 4, wherein the array of actuation elements comprises a linear resistive heater.

6. The microfluidic device of claim 4, wherein the array of actuation elements comprises an optical device.

7. The microfluidic device of claim 4, wherein the array of actuation elements comprises a microwave device.

8. The microfluidic device of claim 1, wherein the array of actuation elements comprises a Peltier device.

9. The microfluidic device of claim 1, wherein the microfluidic sample is a solution including a solute and a solvent, further wherein the solute is the constituent element that is fractionally excluded from the microfluidic sample.

10. The microfluidic device of claim 1, wherein the microfluidic sample includes a liquid and suspended particulates, further wherein the excluded particulates comprise the constituent element that is fractionally excluded from the microfluidic sample.

11. The microfluidic device of claim 1, further comprising a first inlet connected to the microfluidic channel and configured to introduce the microfluidic sample into the microfluidic channel in the direction of flow, wherein the inlet has a width less than a maximum width of the zone of the microfluidic channel.

12. The microfluidic device of claim 1, further comprising a flow mechanism configured to maintain a flow of the microfluidic sample through the microfluidic channel in the direction of flow along the length of the microfluidic channel during the fractional exclusion.

13. The microfluidic device of claim 12, wherein the flow mechanism is configured to maintain the flow of the microfluidic sample through non-frozen zones of the microfluidic channel in the direction of flow along the length of the microfluidic channel during the fractional exclusion.

14. The microfluidic device of claim 1, wherein the microfluidic sample is a solution containing at least one contaminant, further wherein the contaminant is the constituent element that is fractionally excluded from the solution.

15. The microfluidic device of claim 1, wherein one of the zones of the microfluidic channel is configured to receive a concentrated portion of the excluded constituent element.

16. The microfluidic device of claim 1, wherein a plurality of the zones of the microfluidic channel are respectively positioned to receive a different constituent element excluded from the microfluidic sample.

17. The microfluidic device of claim 1, wherein at least one zone of the microfluidic channel is configured to receive a different concentration of excluded constituent element than is another sector of the microfluidic channel.

18. The microfluidic device of claim 1, further comprising:
an inlet connected to the microfluidic channel;
wherein the microfluidic channel increases in size as it extends from the inlet.

19. The microfluidic device of claim 1, further comprising:
an inlet connected to the microfluidic channel;
wherein the microfluidic channel decreases in size as it extends from the inlet.

20. A microfluidic device for separating a constituent element from a microfluidic sample, comprising:

a microfluidic channel having microfluidic dimensions and configured to receive a microfluidic sample, the microfluidic channel having a width and a length, being configured to conduct the microfluidic sample in a direction of flow along the length of the microfluidic channel, a plurality of sectors being defined within the microfluidic channel, each sector being elongated in a direction parallel to the length of the microfluidic channel, each sector being narrower than the width of the microfluidic channel, and immediately adjacent to at least one other sector; and an actuation module including an array of actuation elements adjacent to the microfluidic channel, the actuation elements respectively comprising linear elements arranged adjacent to and parallel to one another and parallel to the length of the microfluidic channel and being elongated in a direction parallel to the width of the microfluidic channel, each actuation element operatively interfaced with and parallel to a respective sector of the microfluidic channel, the array of actuation elements being actuatable independently of one another and configured to sequentially induce phase changes in portions of the microfluidic sample in respective sectors of the microfluidic channel in a direction perpendicular to the flow of the microfluidic sample and parallel to the width of the microfluidic channel by independently and sequentially freezing the portions of the microfluidic sample so as to fractionally exclude the constituent element from the microfluidic sample in a direction perpendicular to the flow of the microfluidic sample and parallel to the width of the microfluidic channel.

21. The microfluidic device of claim 20, wherein the actuation elements are configured to sequentially move the constituent element toward a single sector of the microfluidic channel.

22. The microfluidic device of claim 20, wherein the array of actuation elements is further configured to melt portions of the microfluidic sample in sectors adjacent to the respective actuation elements.

23. The microfluidic device of claim 20, wherein the array of actuation elements comprises an array of linear resistive heaters.

24. The microfluidic device of claim 20, wherein the array of actuation elements comprises an array of optical devices.

25. The microfluidic device of claim 20, wherein the array of actuation elements comprises an array of microwave devices.

26. The microfluidic device of claim 20, wherein the array of actuation elements comprises an array of Peltier devices.

27. The microfluidic device of claim 20, wherein the microfluidic sample is a solution including a solute and a solvent, further wherein the solute is the constituent element that is fractionally excluded from the microfluidic sample.

28. The microfluidic device of claim 20, wherein the microfluidic sample includes a liquid and suspended particulates, further wherein the excluded particulates comprise the constituent element that is fractionally excluded from the microfluidic sample.

29. The microfluidic device of claim 20, further comprising a first outlet connected to the microfluidic channel and configured to receive the excluded constituent element from the microfluidic channel.

30. The microfluidic device of claim 29, wherein a remaining portion of the microfluidic sample from which the constituent element has been excluded is a purified microfluidic sample, the device further comprising a second outlet connected to the microfluidic channel configured to receive the purified microfluidic sample from the microfluidic channel.

31. The microfluidic device of claim 30, further comprising a first inlet connected to the microfluidic channel and configured to introduce the microfluidic sample into the microfluidic channel, wherein the inlet has a width less than a maximum width of the portion of the microfluidic sample undergoing a phase change.

32. The microfluidic device of claim 31, further comprising a flow mechanism for maintaining a flow of the microfluidic sample along the length of the microfluidic channel during the fractional exclusion.

33. The microfluidic device of claim 32, wherein the flow mechanism is configured to maintain the flow of the microfluidic sample through non-frozen zones along the length of the microfluidic channel during the fractional exclusion.

34. The microfluidic device of claim 20, wherein the microfluidic sample is a solution containing at least one contaminant, further wherein the contaminant is the constituent element that is fractionally excluded from the solution.

35. The microfluidic device of claim 20, wherein at least one of the sectors is configured to receive a concentrated portion of the excluded constituent element.

36. The microfluidic device of claim 20, wherein a plurality of the sectors are respectively positioned to receive a different constituent element excluded from the microfluidic sample.

37. The microfluidic device of claim 36, further comprising an inlet and a plurality of outlets connected to the microfluidic channel, wherein each of the outlets is positioned adjacent to a respective sector that is configured to receive a respective constituent element that is excluded from the microfluidic sample.

38. The microfluidic device of claim 20, wherein the actuation module is configured such that at least one sector of the microfluidic channel receives a different concentration of excluded constituent element than a concentration of excluded constituent element in another sector of the microfluidic channel.

39. The microfluidic device of claim 20, further comprising:
   an inlet connected to the microfluidic channel; and
   at least one outlet connected to the microfluidic channel,
   wherein the microfluidic channel increases in size as it extends from the inlet to the at least one outlet.

40. The microfluidic device of claim 20, further comprising:
   an inlet connected to the microfluidic channel; and
   at least one outlet connected to the microfluidic channel,
   wherein the microfluidic channel decreases in size as it extends from the inlet to the at least one outlet.

41. The microfluidic device of claim 30, wherein an intersection between the first and second outlets is laterally adjacent to the array of actuation elements such that the separated constituent element flows immediately into the first outlet and the purified portion flows immediately into the second outlet.

* * * * *